(12) United States Patent
Julazadeh et al.

(10) Patent No.: US 6,539,715 B2
(45) Date of Patent: Apr. 1, 2003

(54) TURBOCHARGER SWIVEL CONNECTOR

(75) Inventors: Mahmood Julazadeh, Chillicothe, IL (US); James C. Smith, Washington, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 09/739,413

(22) Filed: Dec. 18, 2000

(65) Prior Publication Data

US 2002/0073702 A1 Jun. 20, 2002

(51) Int. Cl.$^7$ ............................................. F02D 23/00
(52) U.S. Cl. ..................... 60/602; 285/281; 285/370; 285/148.13; 285/179; 285/351; 285/275; 285/196
(58) Field of Search .................. 60/602, 603; 285/272, 285/274, 275, 281, 351, 370, 148.13, 179, 196, 247

(56) References Cited

U.S. PATENT DOCUMENTS

| | | | |
|---|---|---|---|
| 3,167,330 A | * 1/1965 | Draudt | .................. 285/148.13 |
| 4,243,010 A | 1/1981 | Zopfi | |
| 4,553,504 A | 11/1985 | Duggal et al. | |
| 4,555,904 A | 12/1985 | Melzer et al. | |
| 4,558,889 A | * 12/1985 | Gans | ........................... 285/275 |
| 4,611,465 A | * 9/1986 | Kato et al. | ..................... 60/602 |
| 4,697,423 A | * 10/1987 | Conrad et al. | ............... 285/370 |
| 4,736,969 A | * 4/1988 | Fouts | .......................... 285/245 |
| 4,909,036 A | 3/1990 | Kimura | |
| 4,946,204 A | * 8/1990 | Boticki | ........................ 285/281 |
| 4,960,096 A | 10/1990 | Sukimoto et al. | |
| 5,159,815 A | * 11/1992 | Schlamadinger | .............. 60/603 |
| 5,375,581 A | 12/1994 | Muller-Alander et al. | |
| 5,507,536 A | * 4/1996 | Oliveto, II et al. | .......... 285/196 |
| 5,755,101 A | * 5/1998 | Free et al. | ...................... 60/602 |
| 6,286,877 B1 | * 9/2001 | Mendoza et al. | ............ 285/351 |
| 6,331,020 B1 | * 12/2001 | Brunella | ....................... 285/179 |
| 2001/0054287 A1 | * 12/2001 | Hoecker et al. | ............... 60/602 |

* cited by examiner

Primary Examiner—Thomas Denion
Assistant Examiner—Thai-Ba Trieu
(74) Attorney, Agent, or Firm—Fred J. Baehr, Jr.

(57) ABSTRACT

A 90° swivel connector capable of rotating 360° has threads on one end that screw into a threaded hole in a boss on a compressor portion of a turbocharger and has barbs on the other end of the swivel connector for receiving and retaining a hose. The 360° rotation enables alignment of the swivel connector with the hose to prevent kinking of the hose when the relative angular position of the connector and hose is varied to facilitate diverse engine usage.

2 Claims, 2 Drawing Sheets

TURBOCHARGER SWIVEL CONNECTOR

TECHNICAL FIELD

The invention relates to a swivel connector for a turbocharger and more particularly to a 90° connector with a pipe thread on one end and barbs for receiving a hose on the other end that will swivel or rotate 360° when the pipe thread is seated.

BACKGROUND ART

Turbochargers for internal combustion engines often have a wastegate valve that bypasses exhaust gases around the turbine portion of the turbocharger. The wastegate valve is controlled by the outlet pressure of the compressor portion of the turbocharger to maintain a proper engine boost or combustion air pressure. A hose is used to transmit the compressor outlet pressure from a tap in the outlet of the compressor portion to control the wastegate valve. To accommodate engine installation in various original equipment manufacture's truck chassis the angular orientation of the compressor housing and therefore the relative angularity of the 90° connector in the outlet portion of the compressor varies. An example of such a 90° fitting being connected to a compressor is shown in U.S. Pat. No. 4,553,504 issued to Vinid K. Duggal et al. on Nov. 19, 1985. Although used for a different purpose the 90° fitting appears to be attached at a single position and location and the ability of the 90° fitting to be swiveled is non existent.

The present invention is directed to overcome one or more of the problems associated with the prior art.

DISCLOSURE OF THE INVENTION

In general, a swivel connector for an internal combustion engine having a turbocharger with a turbine portion and a compressor portion, a waste gate valve that bypasses exhaust gasses around the turbine portion, and a hose that transmits outlet pressure of the compressor portion to the waste gate valve for controlling boost pressure of combustion air supplied to the internal combustion engine by the turbocharger has a base portion and a tubular elbow portion. The base portion includes a thread on one end that fits a threaded hole disposed adjacent an outlet of the compressor portion, a polyhedron on the other end and a centrally disposed through hole. The tubular elbow portion includes two leg portions generally disposed at 90° with respect to each other. A curved transition portion connects the leg portions. One of the leg portions has at least one raised portion. The other leg portion has a flange portion, a cylindrical portion which rotatably fits into the through hole in the base portion and an end portion. The end portion flares outwardly over the threaded end of the base portion capturing the base portion between the flange and the flared end of the other leg portion. Thus allowing the tubular elbow portion to rotate 360° and into alignment with the hose.

BEST MODE FOR CARRYING OUT THE INVENTION

Figure 1:
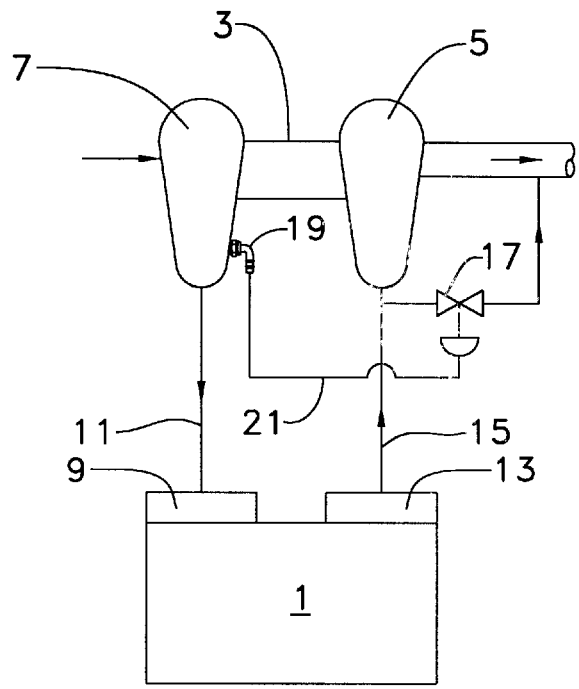
FIG. 1 is a schematic view of an internal combustion engine having a turbocharger and a wastegate for bypassing exhaust gases around the turbine portion of the turbocharger to control the boost pressure of the combustion air.

Referring now to the drawings in detail and in particular to FIG. 1, there is shown an internal combustion engine 1 and a turbocharger 3 having a turbine portion 5 and a compressor portion 7. The compressor portion 7 supplies combustion air to an intake manifold 9 via a conduit 11. An exhaust manifold 13 supplies hot pressurized exhaust gas to the turbine portion 5 via a conduit 15. A wastegate valve 17 is disposed to bypass a portion of the exhaust gases around the turbine portion 5. A swivel connector 19 is disposed in fluid communication with the outlet of the compressor 7. A hose 21 extends from the swivel connector 19 to the wastegate valve 17, which controls the amount of exhaust gases bypassing the turbine portion 5, the output of the turbocharger and the boost pressure of the combustion air.

Figure 2:
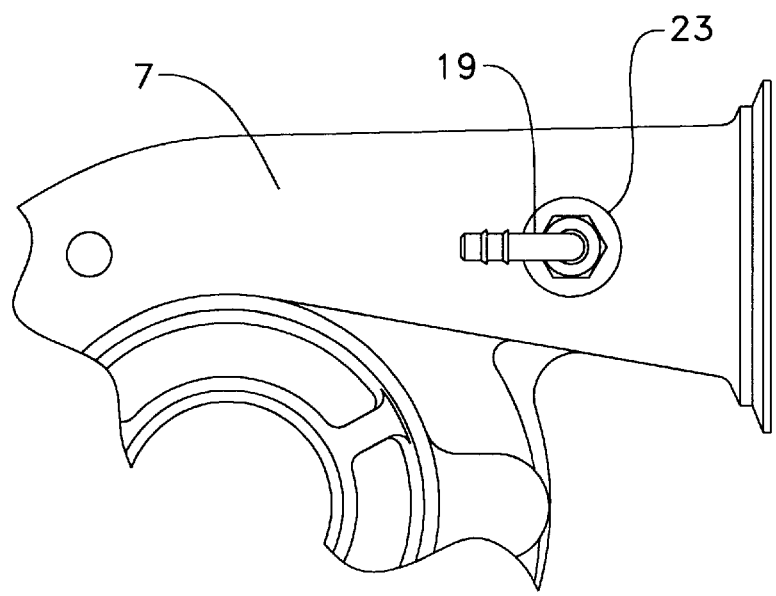
FIG. 2 is a partial elevational view of a compressor portion of the turbocharger showing a swivel connector.

Referring now to FIG. 2 there is shown a portion of the compressor portion 7. A boss 23 is disposed adjacent the outlet of the compressor portion 7. The boss 23 has a drilled and taped hole 24 taped with a tapered pipe thread. While pipe threads are preferred a straight thread may be used. The swivel connector 19 is screwed into the pipe thread.

Figure 3:
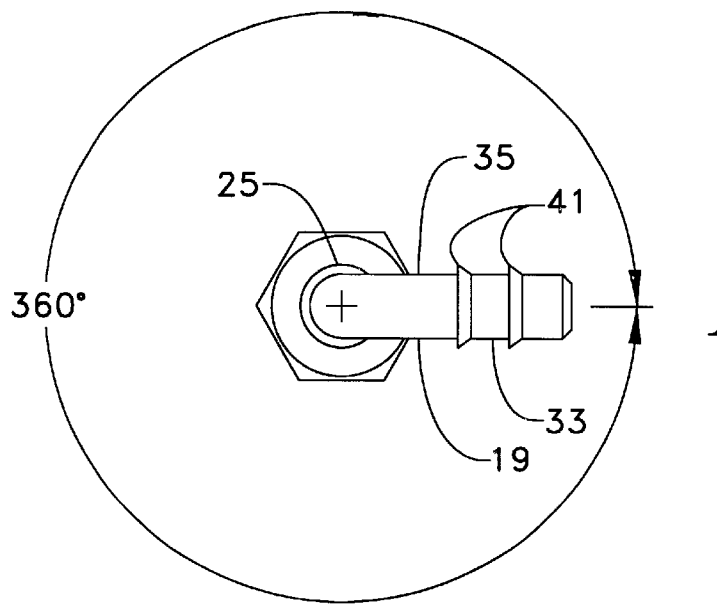
FIG. 3 is a plan view of a swivel connector.
Figure 4:
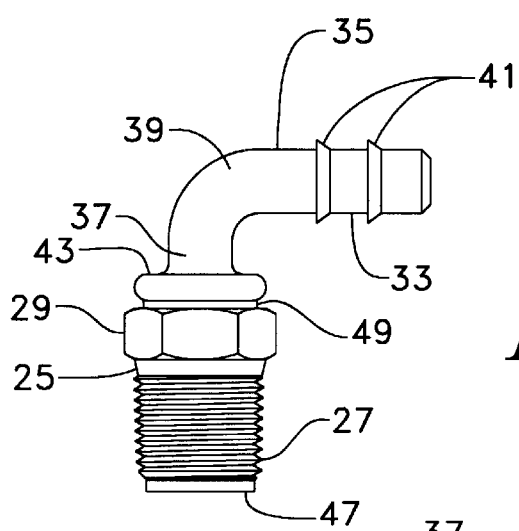
FIG. 4 is an elevational view of the swivel connector.
Figure 5:
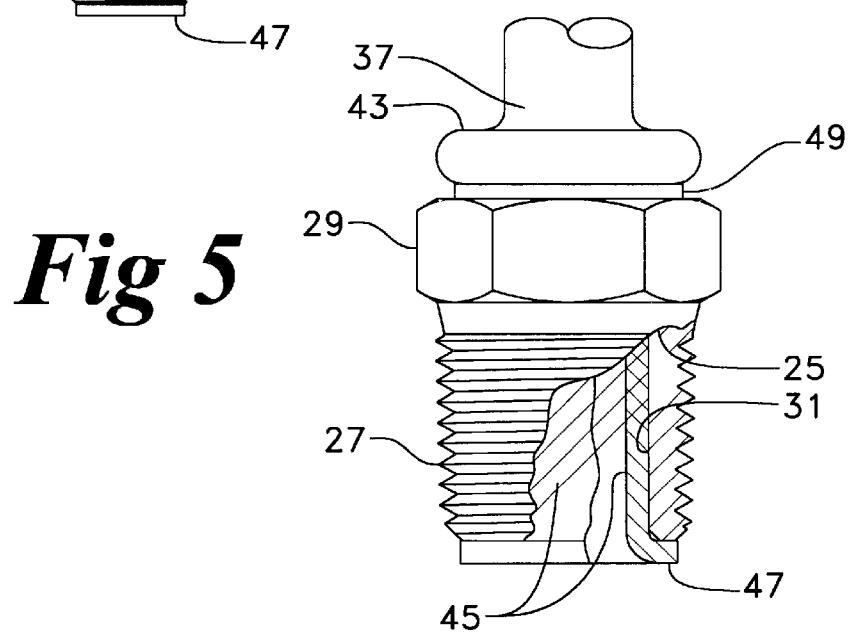
FIG. 5 is an enlarged partial elevational view of the swivel connector partially in section.

Referring now to FIGS. 3, 4 and 5 the swivel connector 19 has a base portion 25 having a tapered pipe thread 27 on one end, a polyhedron 29 on the other end, and a centrally disposed through hole 31. While a pipe thread is preferred a straight thread may be used when the drilled and taped hole 24 has a straight thread. The polyhedron 29 is preferably a hexahedron or a hex head for applying a wrench to screw the base 25 in the taped hole 24 in the boss 23. A tubular elbow 33 has two leg portions 35 and 37 generally disposed at 90° with respect to each other and a curved transition portion 39 connecting the leg portions 35 and 37. One of the leg portions 35 has at least one circular raised portion 41 formed by upsetting or other means. While two raised portions 41 are shown, any number of raised portions may be utilized. The raised portions 41 form barbs for retaining the hose 21, which is slipped over the leg portion 35. The other leg portion 37 has a flange portion 43 formed by upsetting or other means, a cylindrical portion 45 that rotatably fits into the centrally disposed hole 31, and an end portion 47 flaring outwardly over the pipe thread end 27 of the base 25. Thus the base 25 is captured between the flange 43 and the flared end 47, but is free to rotate 360°. A washer 49 is preferably disposed between the flange 43 and the polyhedron portion 29 of the base 25, but is not required. The washer is preferably made of a material that will form a seal and allow the elbow portion 33 to be rotated as required with respect to the base portion 25.

INDUSTRIAL APPLICABLITY

In the manufacturing process the threaded end 27 of the swivel connector 19 is screwed into the tapped hole 24 in the boss 23 on the outlet of the compressor portion 7 of the turbocharger 3 and tightened utilizing a wrench on the hex head 29. The leg portion 35 is rotated into alignment with the hose 21, which is forced over the tubular leg 35 and over the barbs 41 holding the hose 21 on the tubular leg 35 of the swivel connector 19. The barbs 41 and tight fitting hose 21 cooperate to provide a sealed juncture between the swivel connector 19 and the hose 21 without requiring additional hose clamps. The washer 49 cooperates with the flange portions 43 and 47 to form a seal between the leg portion 37 and the base 25. The tapered pipe thread 27 forms a seal with the threaded hole 24 in the boss 23. The swivel connector 19 can thus be rotated 360° to align it with the hose 21 while maintaining a seal. The swivel connector 19 also is economical to manufacture and allows various angular orientations of the compressor housing 7 and angularity of the 90° connector to accommodate various original equipment manufacture's truck chassis without kinking the hose 21.

What is claimed is:

1. An internal combustion engine comprising:
   a turbocharger with a turbine portion and a compressor portion, a wastegate valve that bypasses exhaust gasses around the turbine portion, a swivel connector disposed in fluid communication with a compressor portion and a hose that transmits outlet pressure of the compressor portion to the waste gate valve for controlling boost pressure of combustion air supplied to the internal combustion engine by the turbocharger;
   the swivel connector including a base portion and a tubular elbow portion, the base portion including a thread on one end that fits a threaded hole disposed adjacent an outlet of the compressor portion, a polyhedron on the other end and a centrally disposed through hole;
   the tubular elbow portion including two leg portions generally disposed at 90° with respect to each other and a curved transition portion connecting the leg portions, one of the leg portions having at least one raised portion, the other leg portion having a flange portion, a cylindrical portion which rotatably fits into the centrally disposed through hole in the base portion and an end portion flaring outwardly over the threaded end of the base portion capturing the base portion between the flange and the flared end of the other leg portion allowing the tubular elbow portion to rotate 360° and into alignment with the hose.

2. A method of connecting two components of internal combustion engines in fluid communication, the components being disposed at varying relative angular positions in different engines, the method comprising the steps of:
   connecting a hose to one of the components;
   providing a threaded hole in the other component;
   providing a swivel connector having a base portion and a tubular elbow portion, the base portion including a thread on one end that fits a threaded hole in the other component, a polyhedron on the other end and a centrally disposed through hole; the tubular elbow portion including two leg portions generally disposed at 90° with respect to each other and having a curved transition portion connecting the leg portions, one of the leg portions having at least one raised portion, the other leg portion having a flange portion, a cylindrical portion which rotatably fits into the centrally disposed through hole in the base portion and an end portion flaring outwardly over the threaded end of the base portion capturing the base portion between the flange and the flared end of the other leg portion allowing the tubular elbow portion to rotate 360°;
   rotating the leg portion having the raised portion into alignment with the hose; and
   forcing the hose over the leg portion and the raised portion to hold the hose on the swivel connector.

* * * * *